United States Patent [19]
Allen et al.

[11] Patent Number: 5,793,986
[45] Date of Patent: Aug. 11, 1998

[54] METHOD AND SYSTEM FOR ENHANCED EFFICIENCY OF DATA TRANSFERS FROM MEMORY TO MULTIPLE PROCESSORS IN A DATA PROCESSING SYSTEM

[75] Inventors: Michael Scott Allen; Charles Roberts Moore; Robert James Reese, all of Austin, Tex.

[73] Assignee: International Business Machines Corporation, Armonk, N.Y.

[21] Appl. No.: 551,396

[22] Filed: Nov. 1, 1995

Related U.S. Application Data

[63] Continuation of Ser. No. 10,918, Jan. 29, 1993, abandoned.
[51] Int. Cl.[6] ............................................ G06F 13/00
[52] U.S. Cl. ............... 395/250; 364/239; 364/243.41; 364/260; 364/260.2; 364/DIG. 1
[58] Field of Search ................................. 395/427, 468, 395/250

[56] References Cited

U.S. PATENT DOCUMENTS

| | | | |
|---|---|---|---|
| 4,161,778 | 7/1979 | Getson, Jr. et al. | 395/325 |
| 4,807,109 | 2/1989 | Farrel et al. | 395/325 |
| 4,816,993 | 3/1989 | Takahashi et al. | 395/325 |
| 4,992,930 | 2/1991 | Gilfeather et al. | 395/468 |
| 5,283,886 | 2/1994 | Nishii et al. | 395/425 |
| 5,289,585 | 2/1994 | Kock et al. | 395/325 |

*Primary Examiner*—Kevin J. Teska
*Assistant Examiner*—Ayni Mohamed
*Attorney, Agent, or Firm*—Andrew J. Dillon

[57] ABSTRACT

A method and system for the enhanced efficiency of data transfers from memory to multiple processors in a data processing system. Each of the multiple processors has an associated buffer for storing data transferred via a common bus which couples the processors and memory together. Each of the multiple processors continually monitors the common bus and is capable of asserting a selected control signal in response to an attempted activity of another one of the multiple processors which would violate data coherency within the data processing system during a particular period of time following the attempted activity. Data is transferred from memory to a buffer associated with one of the multiple processors and stored in the buffer in response to a request from the processor associated with the buffer prior to expiration of the particular period of time and prior to a determination of whether or not this transfer will result in a possible data coherency problem. The common bus is continually monitored during the particular period of time. Transfer of the data from the buffer to the processor is prohibited in response to a presence on the common bus of the selected control signal prior to expiration of the particular of time. Transfer of the data from the buffer to the processor is permitted in response to an absence on the common bus of the selected control signal.

14 Claims, 3 Drawing Sheets

METHOD AND SYSTEM FOR ENHANCED EFFICIENCY OF DATA TRANSFERS FROM MEMORY TO MULTIPLE PROCESSORS IN A DATA PROCESSING SYSTEM

This is a continuation of application Ser. No. 08/010,918, filed 29 Jan. 1993, now abandoned.

BACKGROUND OF THE INVENTION

1. Technical Field

The present invention relates in general to enhanced efficiency of transfer of data in a data processing system and in particular to a method and system for enhanced efficiency of transfer of data in a multiprocessor data processing system. Still more particularly, the present invention relates to a method and system for speculatively transferring data within a multiprocessor data processing system prior to a determination of whether or not that transfer will result in a data coherency problem and then prohibiting a completion of that transfer of data to one of multiple processors in response to a subsequent presence on a common bus of a selected control signal which indicates that the attempted activity would violate data coherency within a multiprocessor data processing system.

2. Description of the Related Art

Designers of modern state-of-the-art data processing systems are continually attempting to enhance the performance aspects of such systems. One technique for enhancing data processing system efficiency is to provide multiple processors within the system. Each processor within a multiprocessor data processing system typically includes a small specialized memory or "cache" which is preferably utilized to access data or instructions within system memory in a manner well known to those having skill in the art. The sizing and utilization of cache memory systems is a well known subspecialty within the data processing art and is not addressed within the present application. However, those skilled in the art will appreciate that by utilizing modern associative cache techniques, a large percentage of memory accesses within a system may be achieved utilizing data which is temporarily stored within a cache/memory interface.

One problem which occurs in multiprocessor systems wherein memory is distributed into smaller caches is that certain cache operations force a processor to flush and/or invalidate a block of data within its associated cache. In a single processor environment this is a relatively straightforward operation since the block of data may exist within only one of two places. That is, either within the cache or within main memory. However, in a multiprocessor environment these functions are complicated by the fact that other processors may have the same block of data within an associated cache and that block of data may be unaltered or altered.

One method for maintaining data coherency in a multiprocessor system requires that the data be verified as "good data" before the data is actually transferred to the requesting microprocessor. A time delay is incurred in these systems while the verification process occurs. In multiprocessor systems where each processor may include its own cache, this time delay increases because each cache must be checked. This is accomplished by permitting each processor to "snoop" activities on the common bus in order to investigate requests which are directed at data addressed which may result in a data coherency problem.

It should therefore be apparent that a need exists for a method and system for enhanced efficiency of transfer of data by permitting the speculative transfer of data in a multiprocessor data processing system prior to determining whether or not a data coherency problem exists and then prohibiting completion of that transfer of data in response to a presence on a common bus of a selected control signal which indicates that the attempted activity would violate data coherency.

SUMMARY OF THE INVENTION

It is therefore one object of the present invention to provide enhanced efficiency of transfer of data in a data processing system.

It is another object of the present invention to provide an improved method and system for enhanced efficiency of transfer of data in a multiprocessor data processing system.

It is yet another object of the present invention to provide an improved method and system for speculatively transferring data within a multiprocessor data processing system prior to a determination of whether or not that transfer will result in a data coherency problem and then prohibiting a completion of that transfer of data to one of multiple processors in response to a subsequent presence on a common bus of a selected control signal which indicates that the attempted activity would violate data coherency within a multiprocessor data processing system.

The foregoing objects are achieved as is now described. A method and system are provided for the enhanced efficiency of data transfers from memory to multiple processors in a data processing system. Each of the multiple processors has an associated buffer for storing data transferred via a common bus which couples the processors and memory together. Each of the multiple processors continually monitors the common bus and is capable of asserting a selected control signal in response to an attempted activity of another one of the multiple processors which would violate data coherency within the data processing system during a particular period of time following the attempted activity. Data is transferred from memory to a buffer associated with one of the multiple processors and stored in the buffer in response to a request from the processor associated with the buffer prior to expiration of the particular period of time and prior to a determination of whether or not this transfer will result in a possible data coherency problem. The common bus is continually monitored during the particular period of time. Transfer of the data from the buffer to the processor is prohibited in response to a presence on the common bus of the selected control signal prior to expiration of the particular period of time. Transfer of the data from the buffer to the processor is permitted in response to an absence on the common bus of the selected control signal.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
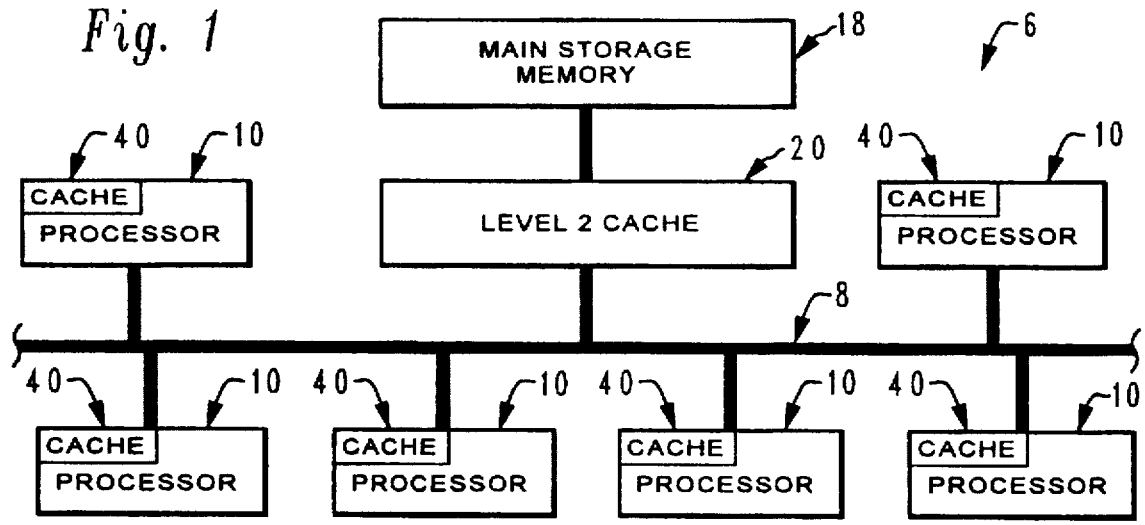
FIG. 1 is a high level block diagram depicting a multiprocessor data processing system which may be utilized to implement the method and system of the present invention.

With reference now to the figures and in particular with reference to FIG. 1, there is depicted a high level block diagram illustrating a multiprocessor data processing system 6 which may be utilized to implement the method and system of the present invention. As illustrated, multiprocessor data processing system 6 may be constructed utilizing multiscalar processors 10 which are each coupled to system memory 18 utilizing bus 8. In a tightly-coupled symmetric multiprocessor system, such as multiprocessor data processing system 6, each processor 10 within multiprocessor data processing system 6 may be utilized to read from and write to memory 18.

As illustrated within FIG. 1, and as will be explained in greater detail herein, each processor 10 within multiprocessor data processing system 6 includes a cache memory 40 which may be utilized to efficiently and temporarily access and store selected instructions or data from system memory 18. In view of the fact that a cache memory constitutes a memory space, it is important to maintain coherency among each cache memory 40 within multiprocessor data processing system 6 in order to assure accurate operation thereof. In addition to cache 40, a level two cache 20, or secondary cache, may be provided between memory 18 and bus 8. Level two cache 20 is provided in order to improve the efficiency of data transfers. Typically, level two cache 20 is larger and may store more data than cache 40 but has a slower response time. Level two cache 20 includes a copy of the data stored in cache 40 in addition to other data that is likely to be requested by one of processors 10. Therefore, with the addition of level two cache 20, there is an increased likelihood the data requested by one of processors 10 will be found in either cache 40 or level two cache 20.

Figure 2:
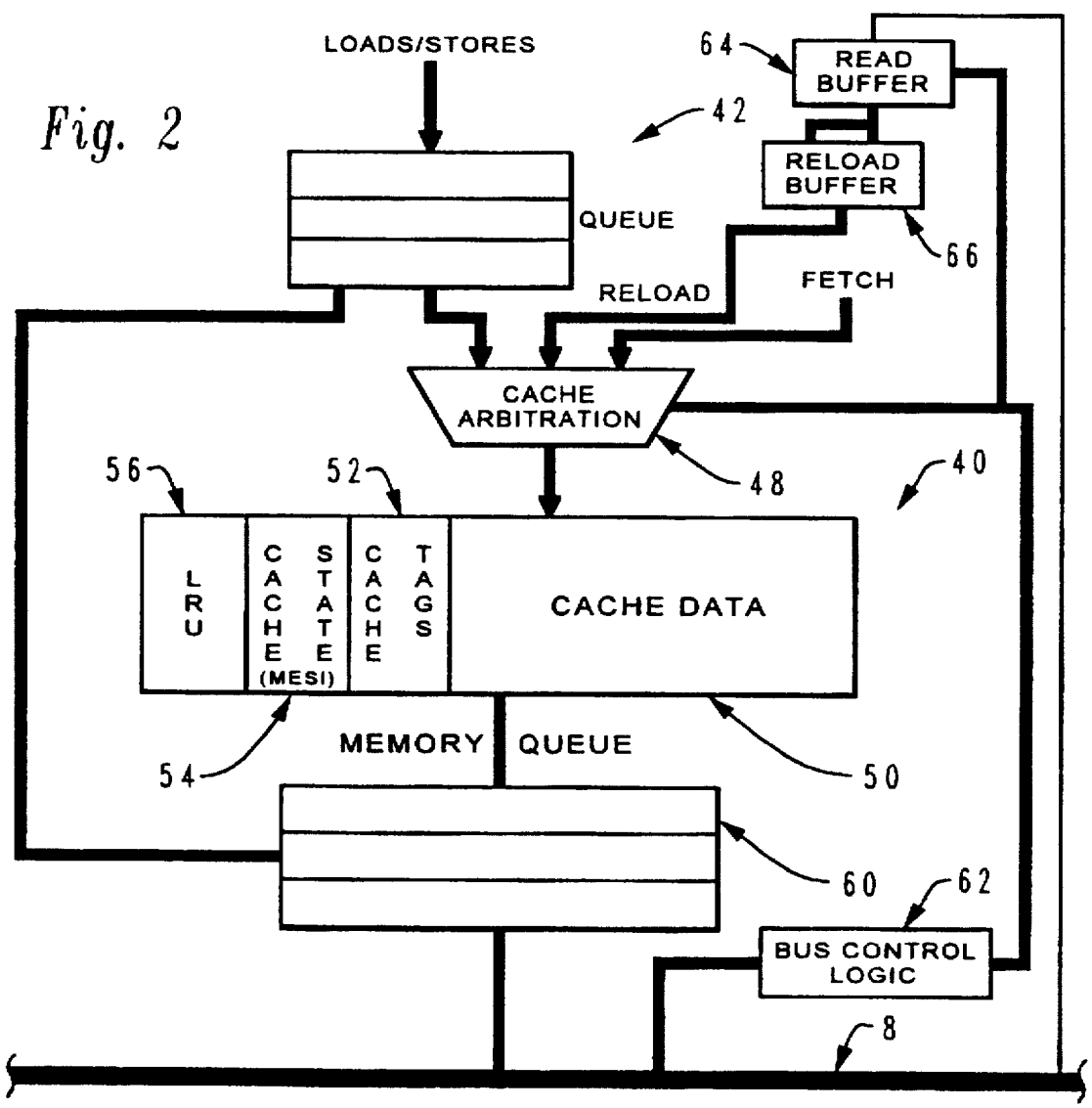
FIG. 2 is a high level block diagram of cache memory/bus interface in the multiprocessor data processing system of FIG. 1.

Referring now to FIG. 2, there is depicted a high level block diagram of a cache memory/bus interface in the multiprocessor data processing system of FIG. 1. As illustrated, cache memory 40 is coupled to bus 8 via a memory queue 60. In accordance with an important feature of the present invention, loads and stores to cache memory 40 are coupled to cache memory 40 via input queue 42. Access to cache memory 40 is obtained through cache arbitration control 48, in a manner well known to those having ordinary skill in the art.

As depicted within cache memory 40, a plurality of cache tags 52 are generally provided. Each cache tag is utilized to designate and control access to cache data 50 within cache memory 40. Additionally, cache state section 54 is also depicted within cache memory 40. Cache state section 54 is utilized to provide an indication of the cache state for each entry within cache memory 40. In the depicted embodiment of the present invention a four state cache protocol typically referred to as "MESI" is utilized. Those having skill in the art will appreciate that each of these four letters corresponds to a particular state for data within cache memory 40. Thus, the four states are "modified"; "exclusive"; "shared"; and, "invalid". Additionally, a least recently used protocol 56 is also depicted within cache memory 40. Least recently used protocol 56 is utilized, as those having ordinary skill in the art will appreciate, to determine what data must be removed from cache memory 40 if additional data is to be entered into cache memory 40 as a result of required data not being present within the cable.

In a multiprocessor system, multiprocessors may be attempting to access or alter the same data at approximately the same time. In order to maintain data coherency, processors 10 monitor, or "snoop", the activities of the other processors by inputting all data on bus 8 into read buffer 64. Each processor 10 may then determine whether an activity by another processor 10 will violate data coherency. In the event data coherency will be violated, a processor 10 must be capable of asserting a selected control signal on bus 8 which indicates the possible data coherency problem. Data in read buffer 64 is placed in reload buffer 66. In the event data coherency will be violated, data in reload buffer 66 is prohibited from being transferred into processor 10.

Bus control logic 62 indicates to reload buffer whether or not a selected control signal is present on bus 8 during a particular period of time after the attempted activity. If a selected control signal is not present during the particular period of time after the attempted activity, data in reload buffer 66 is placed in cache arbitration 48.

Figure 3:
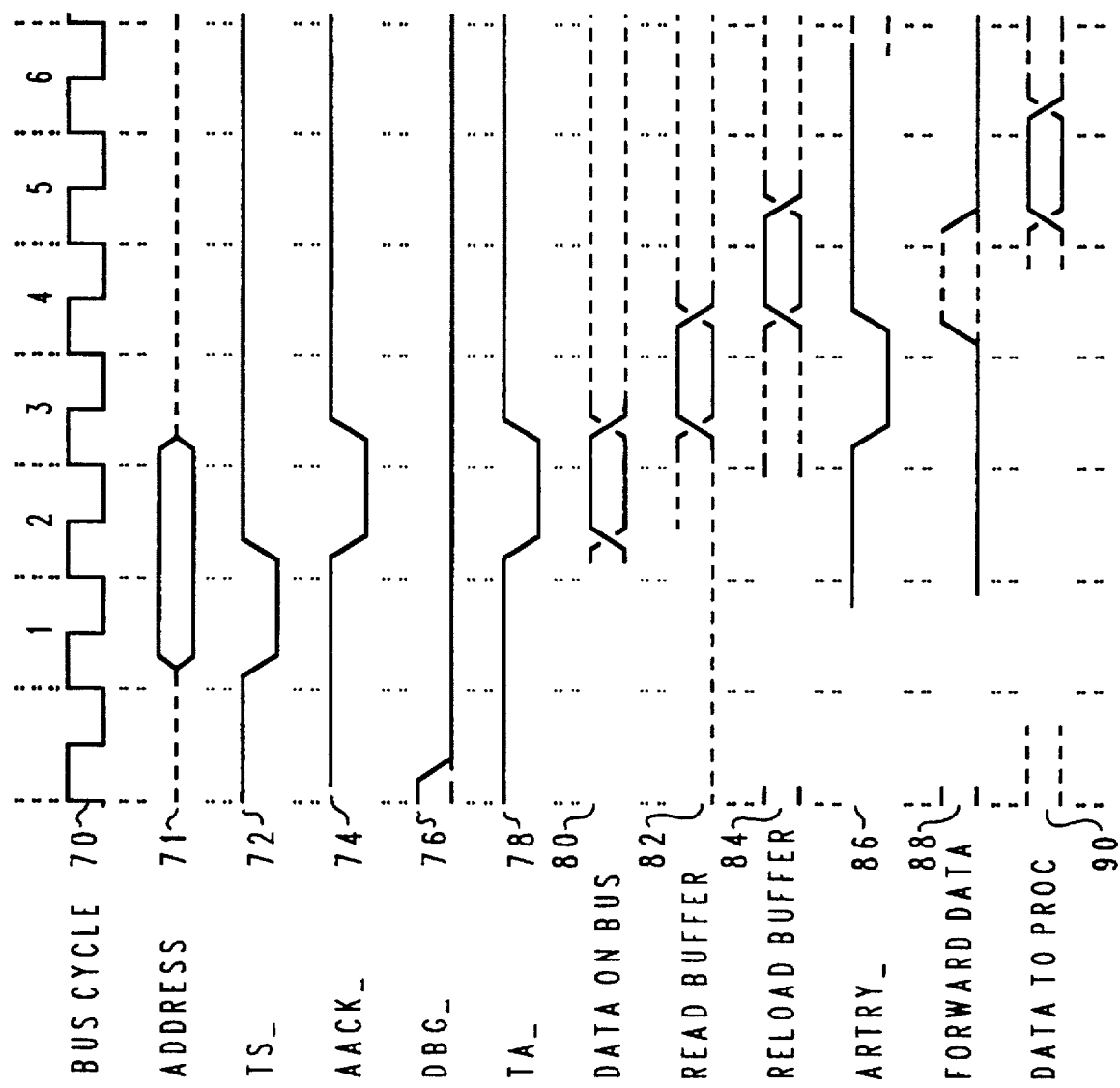
FIG. 3 is a timing diagram depicting a data transfer in accordance with the present invention.

Referring now to FIG. 3, there is depicted a timing diagram which illustrates a data transfer in accordance with the present invention. Signal 70 illustrates a synchronous bus which clocks the other signals depicted. Signal 71 illustrates the address and address coincidence control signals. Signal 72 depicts the start of the address bus cycle. One of processors 10 may request data by transferring the address of the data. Next, Signal 74 illustrates the acknowledgment of the end of the address transfer. Signal 76 depicts the grant of the data bus which is typically asserted for a data transfer. Thereafter, Signal 78 illustrates an acknowledgement that data has been transferred into processor 10. This acknowledgement occurs concurrent with the actual transfer of data. Signal 80 depicts the presence of data on bus 8 associated with the address transferred depicted by Signals 72 and 74.

Next, Signal 82 illustrates the data from bus 8 now being present in read buffer 64. As illustrated, data is transferred into read buffer 64 during clock cycle 3, while an acknowledgement of the data transfer has already occurred at clock cycle 2. The data is then transferred into reload buffer 66 during clock cycle 4 as depicted by Signal 84. Processor 10 monitors bus 8 during this time and may detect the presence of Signal 86 as illustrated. Signal 86 is asserted when a data coherency problem is detected. In the event Signal 86 is detected, Signal 88 is not asserted and the nonassertion thereof prohibits the data from being transferred to the processor. If, however, Signal 86 is not detected, Signal 88 is not asserted and the data may be transferred to the processor as depicted by Signal 90.

Figure 4:
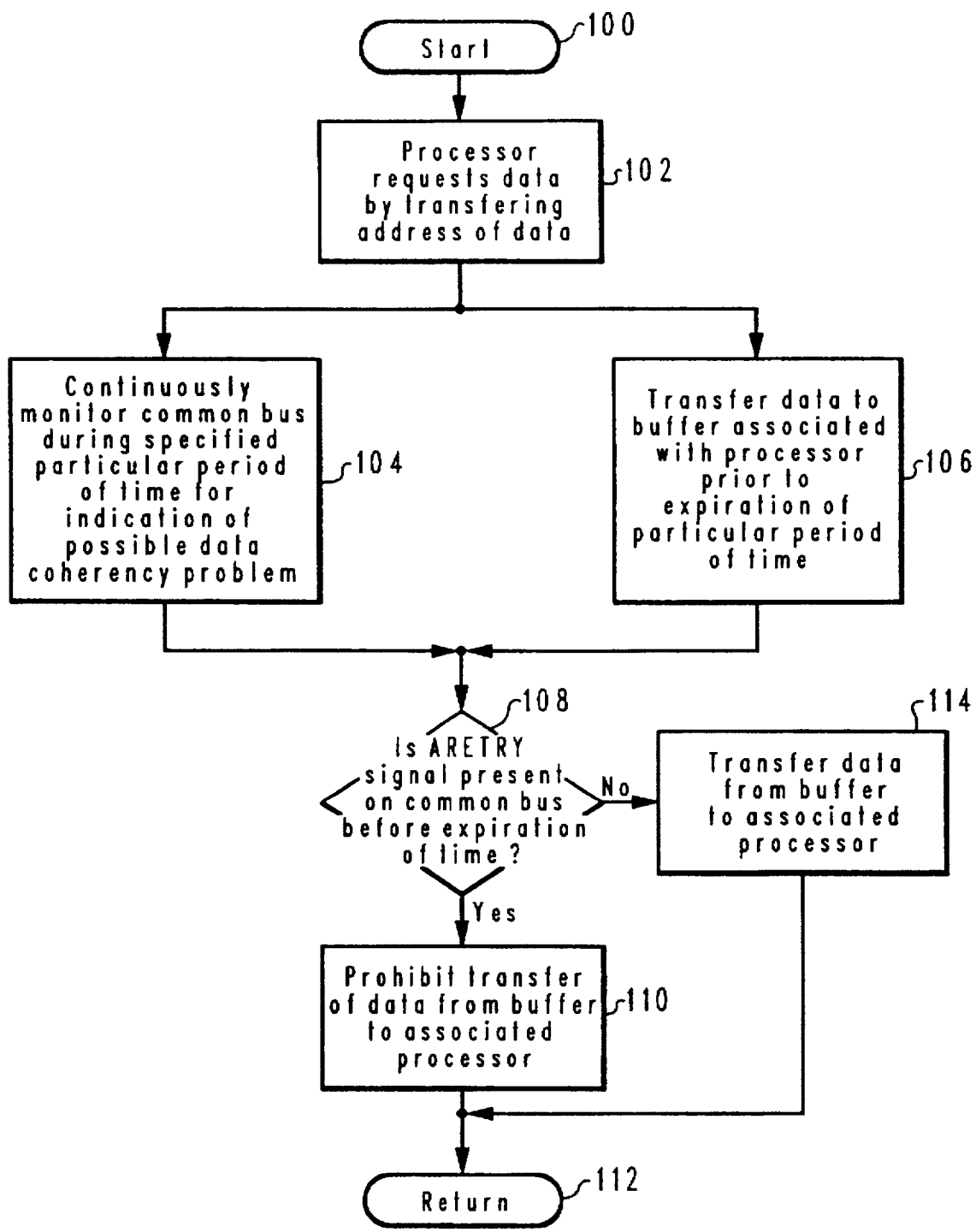
FIG. 4 is a high level flow chart illustrating the transfer of data from a buffer to a processor associated with the buffer in accordance with the present invention.

With reference to FIG. 4, there is depicted a high level flowchart which illustrates the transfer of data from a system memory to a buffer associated with a processor in accordance with the method and system of the present invention. As depicted, the processes begins at block 100 and thereafter passes to block 102. Block 102 illustrates the initiation of a data transfer request by a processor within multiprocessor data processing system 6. This initiation occurs as a result of the request for data and the transferring of the address for that data onto bus 8.

Next, in accordance with an important feature of the present invention, two processes occur contemporaneously.

Namely, block 104 illustrates the continuous monitoring of the common bus during that specified period of time within which other processors may indicate a data coherency problem associated with the transfer of data. Simultaneously, block 106 illustrates the transfer of that data to a buffer associated with the initiating processor during the pendency of the permitted period of time during which other processors may indicate the possibility of a data coherency problem. Those skilled in the art will appreciate that in this manner data may be transferred rapidly from a high speed cache memory prior to the expiration of the latency period required to determine whether or not a data coherency problem exists, greatly enhancing the efficiency of data transfer.

Next, referring to block 108, a determination is illustrated as to whether or not an address retry or "ARETRY" signal is present on the common bus prior to the expiration of the period of time permitted for other processors to indicate the possibility of a data coherency problem. The ARETRY signal is the signal typically utilized in such systems by processors to indicate the possibility of a data coherency problem and may be repeatedly asserted until such time as the data coherency problem has been resolved by the processor which initiates the ARETRY signal. In the event an ARETRY signal has been asserted by an alternate processor within the system, the processes passes to block 110.

Block 110 illustrates the prohibition of the transfer of the data from the buffer to an associated processor. Thus, data may be transferred from memory to a buffer associated with a processor prior to an actual determination whether or not a data coherency problem may exist and then the transfer of that data from the buffer to the processor will be selectively prohibited if a signal is present on the bus indicating that a possible data coherency problem exists. Thereafter, the process passes to block 112 and returns to await the occurrence of a subsequent transfer.

Referring again to block 108 in the event no ARETRY signal is asserted on the common bus by an alternate processor prior to the expiration of the period of time during which that signal is permitted, the processes passes to block 114. Block 114 illustrates the immediate transfer of that data from the buffer to its associated processor, greatly enhancing the speed and efficiency with which data may be transferred to a processor. In this manner, rather than await the period of time during which alternate processors may indicate the possibility of a data coherency problem and thereafter, initiating the transfer of data from memory to the processor, the method and system of the present invention permits that data to be speculatively transferred from memory to a buffer associated with a processor and the control of the transfer of that data from the buffer to the associated processor is then accomplished utilizing the presence or absence of a signal indicating the possibility of a data coherency problem. After transferring the data from the buffer to the associated processor, the process again passes to block 112 and returns to await a subsequent transfer of data.

While the invention has been particularly shown and described with reference to a preferred embodiment, it will be understood by those skilled in the art that various changes in form and detail may be made therein without departing from the spirit and scope of the invention.

What is claimed is:

1. A system, comprising:
    a memory for outputting information in response to a request;
    a first processor coupled to said memory for outputting said request, said first processor including:
        a cache memory section for storing data and instructions;
        a buffer section coupled to said cache memory section, said buffer section for inputting said information from said memory into said buffer section before expiration of a specified time period after said request and for selectively transferring said information to said cache memory section in response to expiration of said specified time period, said specified time period being a period of time during which a second processor may indicates a violation of data coherency, wherein said buffer section is operable to transfer said information to said cache memory section in response to expiration of said specified time period if a control signal is absent before expiration of said specified time period; and
        a logic section for prohibiting said transferring in response to said control signal, and;
    said second processor coupled to said first processor for outputting said control signal before expiration of said specified time period in response to said request violating coherency of said information, wherein said information is received within said buffer section during said specified time period during which said control signal indicating a violation of coherency is outputted.

2. The system of claim 1, wherein said first processor is operable to output said request by outputting an address of said information.

3. The system of claim 2, wherein said signal includes an address retry signal.

4. The system of claim 1, wherein said memory is a level two cache memory.

5. The system of claim 1, wherein said information includes data information.

6. A system, comprising:
    a memory for outputting information in response to a request;
    a first processor coupled to said memory for outputting said request;
    logic coupled to said memory and said first processor for inputting said information from said memory into said logic before expiration of a specified time period after said request, for selectively transferring said information to a section of said first processor in response to expiration of said specified time period, and for prohibiting said selectively transferring in response to a control signal, said specified time period being a period of time during which a second processor indicates a violation of data coherency, wherein said logic is operable to transfer said information to said section of said first processor in response to expiration of said specified time period if said control signal is absent before expiration of said specified time period; and
    said second processor, coupled to said logic, for outputting said control signal before expiration of said specified time period in response to said request violating coherency of said information, wherein said information is received within said buffer section during said specified time period during which said control signal indicating a violation of coherency is outputted.

7. The system of claim 6, wherein said first processor is operable to output said request by outputting an address of said information.

8. The system of claim 7, wherein said signal includes an address retry signal.

9. The system of claim 6, wherein said section of said first processor is a cache memory section.

10. The system of claim 9, wherein said first processor includes said logic.

11. A method, comprising:

outputting a request from a first processor;

outputting information from a memory in response to said request;

inputting with logic said information from said memory into buffer included within said fist processor before expiration of a specified time period after said request selectively;

transferring said information from said logic to a cache section of said first processor in response to expiration of said specified time period;

outputting a control signal from a second processor before expiration of said specified time period In response to said request violating coherency of said information;

prohibiting said transferring in response to said control signal; and said buffer section transferring said information from said logic to said cache section of said first processor in response to expiration of said specified time period.

12. The method of claim 11, wherein said outputting a request comprises outputting an address of said information.

13. The method of claim 12, wherein said outputting a signal comprises outputting an address retry signal.

14. The method of claim 11, wherein said selectively transferring comprises selectively transferring said information from said logic to a cache memory section of said first processor in response to expiration of said specified time period.

* * * * *

UNITED STATES PATENT AND TRADEMARK OFFICE
CERTIFICATE OF CORRECTION

PATENT NO. : 5,793,986
DATED : August 11, 1998
INVENTOR(S) : Allen et al.

It is certified that error appears in the above-identified patent and that said Letters Patent is hereby corrected as shown below:

Column 6, Line 11: Please delete the word "may"

Column 7, Line 8: Please add --a-- after the word "into"

Column 7, Line 9: Please put --;-- after "request"

Column 7, Line 10: Please delete "selectively;"

Column 7, Line 11: Please add --selectively-- before "transferring"

Column 7, Line 16: Please change "In" to --in--

Column 8, Line 6: Please add --if said control signal is absent before expiration of said specific time period-- following "... specified time period"

Signed and Sealed this

Twenty-third Day of February, 1999

Attest:

Attesting Officer

Q. TODD DICKINSON

Acting Commissioner of Patents and Trademarks

UNITED STATES PATENT AND TRADEMARK OFFICE
CERTIFICATE OF CORRECTION

PATENT: 5,793,986

DATED: August 11, 1998

INVENTOR (S): Allen et al.

It is certified that error appears in the above-identified patent and that said Letters Patent is hereby corrected as shown below:

On the title page, item [73], insert the following :-- Motorola, Inc. Schaumburg, IL--

Signed and Sealed this

Twenty-fourth Day of August, 1999

Attest:

Q. TODD DICKINSON

*Attesting Officer*    *Acting Commissioner of Patents and Trademarks*